United States Patent

Noorlander

[15] 3,655,515
[45] Apr. 11, 1972

[54] SAMPLE DEVICE AND METHOD
[72] Inventor: Daniel O. Noorlander, Fresno, Calif.
[73] Assignee: Milk Producers, Inc., San Antonio, Tex.
[22] Filed: Sept. 25, 1969
[21] Appl. No.: 861,068

[52] U.S. Cl. ........................... 195/103.5, 195/127, 195/139
[51] Int. Cl. ........................................................ C12k 1/04
[58] Field of Search .................... 195/103.5, 139 LE, 127

[56] References Cited

UNITED STATES PATENTS 2,874,091  2/1959  Fisk ........................ 195/139
3,338,794  8/1967  Bladel ..................... 195/103.5

Primary Examiner—A. Louis Monacell
Assistant Examiner—Robert M. Elliott
Attorney—Beveridge & De Grandi

[57] ABSTRACT

A container for analyzing milk and water for bacteria count formed of a flexible bag having at least one orifice for insertion of a sample and a seal for the orifice. The flexible outer bag is of sufficient size to accommodate a receptacle and cover in spaced-apart relation and allow for manipulation of the cover and receptacle into a closed relationship while within the bag and thereby avoiding undue environmental contamination.

22 Claims, 4 Drawing Figures

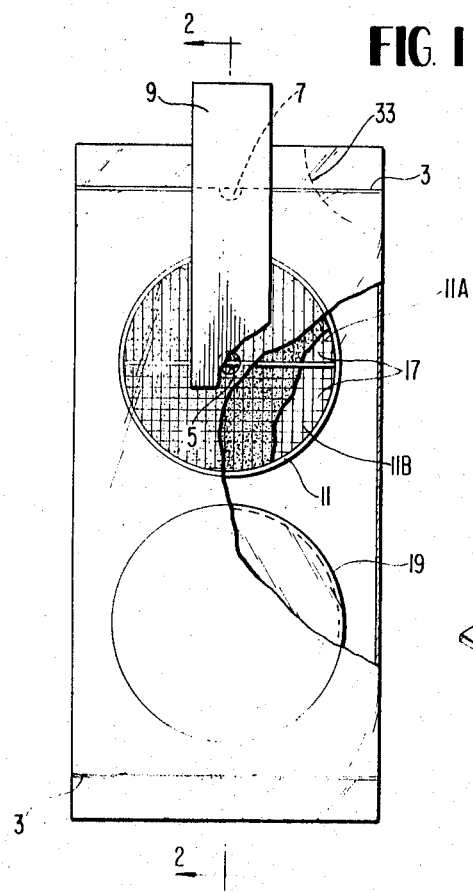
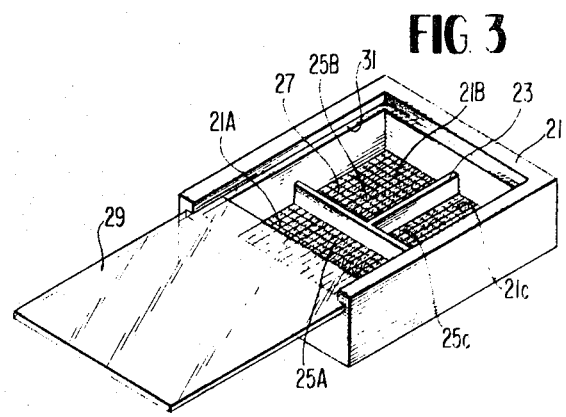
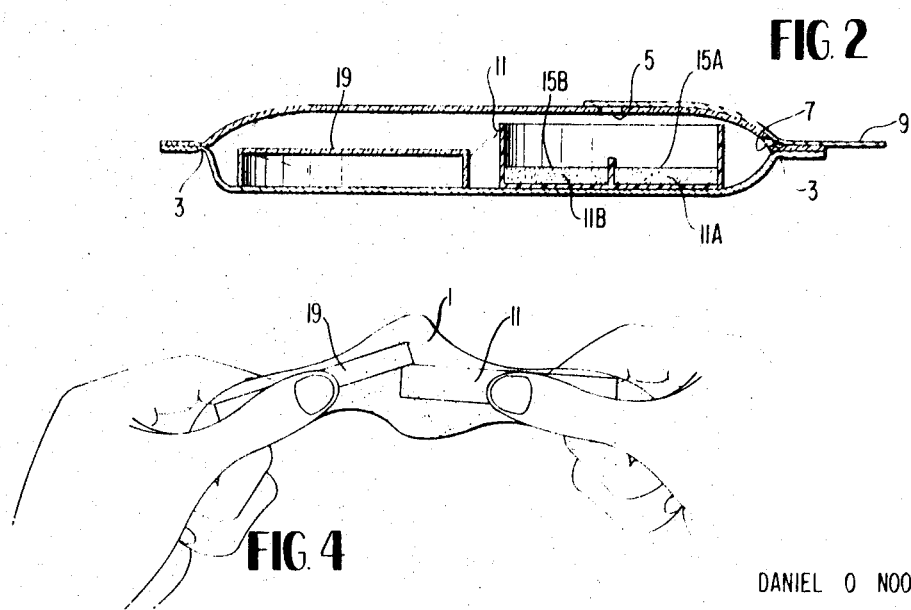
INVENTOR
DANIEL O NOORLANDER
BY Beveridge & DeGrandi
ATTORNEYS

SAMPLE DEVICE AND METHOD

This invention relates to test sample devices and methods for using same. More particularly, this invention relates to a device which may be used to test a material without subjecting the material, the testing medium, or the material container to excess environmental contamination.

It has long been known in the art that environmental conditions can often adversely affect the accuracy of results obtained from testing. Inaccurate test data becomes a troublesome problem in those industries which work with close quality tolerances. Examples of such industries are those industries concerned with providing pure water for human and animal consumption and the milk industry which is concerned with providing humans with wholesome milk, free of harmful organisms.

In order to obtain more accurate test data, the art has developed elaborate equipment, techniques, and methods, for obtaining, testing and analyzing the various materials needed to be tested. Unfortunately, the elaborate nature of these known systems is, in and of itself, a problem since it often results in such a high cost factor in obtaining accurate test data that the systems represent a significant factor in the cost of the ultimate product produced. The art is therefore clearly in need of a testing device and method which are accurate in that they remove the problem of undue environmental contamination, and at the same time are economical to the extent that they do not add a substantial cost factor to the final product produced.

It is the purpose of this invention to provide the art with a device and method for using same, which overcome the above-stated problem by insuring against undue environmental contamination and thus a high degree of accuracy in the test data obtained and at the same time providing a system which is both economical and commercially feasible.

Generally speaking, the subject invention solves the above need in the art by providing a device comprised of a container sealed against undue environmental contamination and having therein an open receptacle for holding a test sample and a cover for the receptacle, said container being sufficiently flexible and of sufficient size to allow the cover to be manipulated from outside the container without opening the container, into closing relationship with the receptacle.

In a preferred embodiment of this invention, the device comprises a flexible outer container or bag which is preferably transparent and which has, prior to complete emission, at least one relatively small orifice in a wall thereof for allowing the admittance thereinto of a material to be tested. Also provided are means for sealing the orifice within the wall of the container, which means may be removed for a time sufficient to allow admittance of the material to be tested. Provided within the outer flexible container is an open rigid receptacle and a cover for the receptacle. The outer container is sufficiently large and flexible to allow for manipulation of the cover within the container so that this cover may be brought into closing engagement with the rigid receptacle without removing the cover or receptacle from the outer container.

Although the subject invention will be described hereinafter as a device for testing and measuring a liquid for bacteria or other micro-organism, it is understood that the invention is not so limited, but rather is applicable to any industry wherein testing, or pretesting procedures, must be carried out in the absence of undue environmental contamination.

Referring to the drawings accompanying this specification, there is illustrated preferred embodiments of the subject invention as follows:

FIG. 1 is a top plan transparent view of a sample testing device in accordance with this invention.

FIG. 2 is a side sectional view of the embodiment as illustrated in FIG. 1 taken along sectional line A—A therein.

FIG. 3 is a perspective view of a rigid receptacle as contemplated by this invention.

FIG. 4 is a side plan view of a manual manipulation of a cover as it is being placed into closing engagement with the open rigid receptacle without the removal of the cover or receptacle from the flexible surrounding container.

DETAILED DESCRIPTION OF THE INVENTION

Referring to FIGS. 1 and 2, there is illustrated a sample device for measuring and testing for micro-organisms in a liquid such as, for example, the bacteria count in a milk sample. The device is comprised of an outer flexible transparent plastic bag 1 which is preferably formed of a conventional transparent plastic such as polyethylene, polypropylene, or polyvinyl chloride. Plastic bag 1 is preferably substantially hermetically sealed at either end thereof by simple heat seals 3 formed in a known manner and is provided in its upper surface with an entrance orifice 5 and preferably with a drain orifice 7. Entrance orifice 5 and drain orifice 7 are optional and as will be explained hereinafter, may be initially omitted in their illustrated form and provided at the appropriate time in the manipulation of the testing procedure by punching (orifice 5) or snipping a corner of bag 1 with scissors (orifice 7), in order to form an orifice therein. In this respect, both orifices should be relatively small as an added protective measure against undue contamination during admittance of the sample material through orifice 5 and drainage through orifice 7. Orifices from about one-sixteenth to one-half inch in diameter are acceptable for the purposes of this invention.

In order to protect plastic bag 1 during shipment and storage from environmental contamination such as that which may occur in the atmosphere of a storage location such as would occur in a barn on a typical dairy farm, there is provided over entrance orifice 5 and drain orifice 7 a strip of conventional adhesive tap 9 which is removable therefrom but which substantially hermetically seals these orifices prior to removal thereof. Adhesive tape 9 may be formed of any well known material but should be of sufficiently high quality so that after removal of the tape to allow admittance of fluid through entrance orifice 5 and drainage of excess liquid through drain orifice 7, the tape may be replaced over these orifices to again insure substantial hermetic sealing thereof.

Within plastic bag 1, there is provided a rigid receptacle 11 preferably formed of a plastic such as polyethylene, polystyrene, etc., or the like. In the embodiment as illustrated in FIGS. 1 and 2, rigid receptacle 11 is provided with two chambers 11A and 11B by means of partition 13. Within each of said chambers 11A and 11B there are provided different bacteria mediums 15A and 15B. Each of these mediums 15A and 15B is a culture medium for a different type of bacteria. In this respect, it is understood that the use of two chambers is only for illustrative purposes and is in no way limiting upon this invention. Only one chamber may be used, or a plurality of chambers greater than two may be used so that any number of bacteria or other micro-organisms may be cultured and tested for.

As illustrated in FIG. 1, culture mediums 15A and 15B used in this embodiment are substantially transparent mediums allowing for the printing of a bacteriological count grid 17 to be printed on rigid receptacle 11 so as to be viewable from the top through the plastic bag 1. The use of a printed grid is, of course, to be used when the bacteria culture mediums employed are transparent. In many instances, such as in the case of blood mediums, these mediums will not be transparent. Therefore, the printed grid 17 will be replaced by a small wire grid located on the upper surface of mediums 15A and 15B which performs the same function as printed grid 17. The use of this wire grid is illustrated in FIG. 3 and will be discussed with respect to the overall embodiment illustrated in that figure.

Also provided within plastic bag 1 is transparent plastic receptacle top or cover 19. As shown in FIG. 1, this top or cover 19 is initially in spaced-apart relation with receptacle 11. This top is sufficiently large in its interior diameter so that it may be placed over receptacle 11 and provide a cover therefor and will also be sufficiently deep that it will not be easily dislodged when placed in closing relationship with receptacle 11. In a preferred embodiment, top 19 will be of a size and shape sufficient so that when it is placed in sealing and closing engagement with receptacle 11, it provides a substantially hermetic seal therefor. By "substantially hermetic seal" is meant a seal which is sufficiently tight to prevent any substantial amount of contaminating (e.g., micro-organism bearing) material from passing through said seal.

Referring to FIG. 3, there is illustrated another embodiment of a receptacle—receptacle top combination as contemplated by this invention. In this figure, there is provided a rigid receptacle 21 having therein three chambers 21A, 21B, and 21C formed by T-shaped partition 23. For the purposes of this embodiment, it is assumed that culture mediums 25A, B, and C located in the bottom of receptacle 21 in their respective chambers 21A, B, and C are not transparent. Therefore, in order to adequately form a testing device for counting the bacteria cultures, there is provided on the top of these mediums a wire bacteria count screen 27 which is clearly visible when viewed from the top. Preferably, both grid 27 and grid 17 (FIG. 1) represent a known volume of test liquid left on the surface of the medium. For example, if milk is being tested, one medium grid block will usually represent about one-tenth of a milliliter of milk.

Receptacle 21, instead of having a separate top as illustrated in FIGS. 1 and 2, has a slidable transparent top 29 which may be placed in open (i.e., spaced-apart relation) or closing relationship with receptacle 21 by sliding it into and through aligning grooves 31 located on either side near the top of rigid receptacle 21. Preferably, grooves 31 and top 29 are so constructed that when top 29 is placed in closing relationship with receptacle 21 there is formed a substantially hermetically sealed closed container.

As can be seen, the embodiment of a receptacle and top as illustrated in FIGS. 1 and 2 are similar to the embodiment illustrated in FIG. 3 in that both of these embodiments are easily manipulated from open position into closed position from outside plastic bag 1 and without removing same therefrom. In this respect, many other modifications of the actual receptacle and top means may be envisioned by one skilled in the art once given the above disclosure. These other features are also contemplated within the scope of the invention, the important feature being that the top must be capable of manipulation into closing contact with the medium-containing receptacle from outside the plastic bag and without removing them therefrom.

As can be seen, the subject invention provides the art with a sample testing device which protects the sample once taken from its initial source, from a substantial amount of outside environmental contaminating effects either during the testing (e.g., growth and counting of the bacteria) or pretesting (shipment to laboratory, etc.) procedures.

As hereinabove alluded to, this invention contemplates the use of a receptacle for merely taking a sample and sending it on to a laboratory, there being no need for a medium or other testing means in the bottom thereof. However, as illustrated, a preferred embodiment for the purposes of this invention contemplates the use of a testing medium in the bottom of the receptacle, particularly a medium which is adapted for the use of bacteria cultures, in combination with a grid device, so that the person taking the sample may also analyze the results of such tests without the time and expense of having to send the sample device to a laboratory for analysis. For these reasons, this invention also contemplates within its scope a novel method of obtaining a test sample which generally comprises initially removing the sealing means from the entrance orifice in the flexible container surrounding the top receptacle device or in the alternative, and where no orifice is initially provided, forming an entrance orifice in the container as by punching, etc. The sample receptacle is then aligned with the entrance orifice and a sample to be tested is admitted through said orifice and into the receptacle. Thereafter the entrance orifice is sealed with a sealing means and the container is lightly rotated or shaken to insure complete coverage of the medium, if such be present, with the sample. Excess testing material is thereafter removed from the container by either a drain means provided in the container or by cutting a drain means in the corner thereof. After draining excess material from the container, these drain means are resealed to prevent undue contamination from environmental sources in a similar manner as the resealing of the entrance orifice was effected.

Now that the sample has been taken and excess material drained from the container, a top is placed upon the rigid open receptacle. In accordance with this invention, and because of the uniqueness thereof, this may be done by manipulation from without the container. As illustrated in FIG. 4, top 19 may be manipulated from outside plastic bag 1 into closing relationship with open receptacle 11 by grasping the rearward portion of top 19 in the left hand through bag 1 and sliding it forward over receptacle 11 which is grasped in the right hand. When using the embodiment as illustrated in FIG. 3, the left hand would merely slide, top 29 forward into closing engagement with receptacle 21.

Referring to the embodiment illustrated in FIGS. 1, 2 and 4, a particularly preferred method for using the sample device in accordance with this invention comprises treating milk directly from a cow's teat which preferably has been sanitized, so as to ascertain whether the cow needs treatment for such things as mastitis or the like. Flexible transparent plastic bag 1 is held underneath the cow and adhesive tap 9 is removed from orifice 5 while receptacle 11 is maintained beneath orifice 5. A milk sample is then injected directly from the teat through orifice 5 and into receptacle 11 which is provided in chambers 11A and 11B with the appropriate bacteria culture mediums 15A and B. Adhesive tape 9 is then reapplied so as to substantially hermetically reseal orifice 5. Receptacle 11 is then grasped in the right hand and given a circular motion so as to insure that the entire surface of the bacteria culture mediums 15A and 15B are contacted by the milk to be tested. Next, adhesive tape 9 is removed from drain orifice 7 and excess milk is drained therefrom out of receptacle 11 and bag 1 by tilting same toward this drain orifice. Again, adhesive tape 9 is replaced in resealing engagement with the bag so as to provide a substantially hermetic seal over drain 7. As described above, drain 7 need not be provided by a preformed hole, but rather, may be provided by snipping an edge of bag 1 along dotted line 33. The hole so formed may then be used as a drainage hole which thereafter may be sealed by using a portion of tape 9 applied thereto.

After drainage of excess milk from the sample device which is now substantially hermetically sealed and therefore protected against undue contamination from environmental sources, top 19 is placed over receptacle 11 in a manner as illustrated in FIG. 4 and described above. In those instances where top 19 provides for a substantial hermetic seal over and around receptacle 11, the bag is no longer necessary and the receptacle device may be removed therefrom for convenience. In those instances where top 19 does not form a substantial hermetic seal, and maximum protection from environmental exposure is desired, bag 1 should be left about the closed receptacle so as to provide a hermetic seal thereabout and protection from detrimental environmental contamination.

Regardless of whether the bag is removed or left in place, the culture medium in receptacle 11 is placed in the appropriate and known environment so as to cause any bacteria selective to the particular medium employed and present in the milk to grow upon the medium. After a prescribed period of time, the receptacle is removed from the growing environment and the medium surface is viewed to see if any cultures appear thereon. If cultures do appear, the particular bacteria is identified and may be treated accordingly. In those instance where quantitative analysis is necessary, the number of cultures are counted upon the medium and within each grid. Thereafter, in accordance with known bacteriological analysis techniques, the number of cultures per grid is then compared to a standard to see if sufficient bacteria exists in the milk to warrant or render necessary the treatment of the cow or to take other protective measures.

In the event that sufficient bacteria grow in any particular chamber, using different mediums, then the sample device is usually sent to a laboratory where the receptacle is opened in a controlled environment and known antibiotic techniques are applied to the various surfaces of the mediums in order to determine the most effective antibiotic for combating the bacteria or other micro-organism which has grown on the surface thereof. As can be seen, not only does bag 1, and/or receptacle top 19 provide for protection at the testing site itself, but also provides for protection upon shipment of the medium from the farm to a laboratory, thus insuring the most accurate possible results with a minimum of cost.

Although the above method has been described with respect to the analysis of milk and the forming of a culture of bacteria in milk upon selected media therefor, it is understood that the subject invention may be used for any material which need be protected from environment contamination. One of these other materials for which the subject invention has been found particularly useful is water. For example, dairy farmers are often troubled with water supplies which may become contaminated with harmful micro-organisms. The subject device provides a simple and economic means for testing these local water supplied such as ponds, etc., from which dairy cattle or other domesticated farm animals may drink. The water from the particular pond or stream is injected through orifice 5 into receptacle 11 having culture media or other analysis materials therein. Upon witnessing in various ways what occurs in this receptacle, which is protected from environmental contamination, an accurate reading of the conditions of the particular water supply is easily obtained from which treatment may be prescribed.

Once given the above disclosure, many other features, variations and modifications will occur to those skilled in the art. For this reason, such variations, modifications and other features are considered to be a part of this invention, the scope of which is to be determined by the following claims.

I claim:

1. A device for obtaining a test sample which comprises in combination a container sealed against undue environmental contamination and having therein a receptacle for holding the test sample and containing at least one micro-organism culture medium therein, and a cover for the receptacle, said container being sufficiently flexible and of sufficient size to accommodate the receptacle and cover when the same are in spaced-apart relation and to allow the cover to be manipulated from outside the container without opening said container into closing relationship with the receptacle, said container having at least one orifice means in a wall thereof through which a sample may be inserted and removable sealing means substantially hermetically sealing said orifice.

2. A device in accordance with claim 1 wherein said receptacle also contains a count grid aligned with said medium to allow for the counting of the number of cultures per grid grown on said medium.

3. A device in accordance with claim 1 wherein said container is a flexible transparent plastic bag and said cover is substantially transparent.

4. A device in accordance with claim 3 wherein said sealing means is removable adhesive tape.

5. A device in accordance with claim 4 wherein said cover, when placed in closing relationship with said receptacle forms a substantially hermetic seal therewith.

6. A device in accordance with claim 1 wherein said container has an entrance orifice means for admitting a sample into said receptacle and a drain orifice means for draining off excess sample, said sealing means being a removable sealing means for sealing both orifices separately or simultaneously.

7. A device in accordance with claim 1 wherein said receptacle is a rigid plastic receptacle having a plurality of chambers therein, each of said chambers having therein a different means for testing said sample.

8. A device for testing a sample of liquid milk comprising a flexible transparent outer container having therein a rigid open receptacle for holding a sample of liquid milk and a cover for said receptacle, said receptacle having therein at least one bacteria culture medium for harmful milk bacteria, said flexible container being sufficiently large to accommodate the receptacle and cover when same are in spaced-apart relation and to allow the cover to be manipulated from outside of the container and without opening the container, into closing relationship with said receptacle, said flexible container having in a wall thereof an orifice means through which a sample of liquid milk may be inserted into said receptacle and sealing means sealing said orifice against undue environmental contamination.

9. A device in accordance with claim 8 wherein said cover is substantially transparent and said receptacle also includes a grid so aligned with said bacteria culture medium to allow the average number of bacteria cultures per grid which form on said medium to be counted.

10. A device in accordance with claim 9 wherein said receptacle contains a plurality of chambers each containing a separate bacteria culture medium.

11. A method of obtaining a sample for testing comprising
providing within a flexible container sealed against undue environmental contamination, a rigid open receptacle and a rigid cover therefor,
providing within a wall of said flexible container an orifice for admitting the sample into said rigid receptacle,
passing the sample through said orifice and into said receptacle, and
closing said receptacle with said cover from outside of said container, but without removing said cover or said receptacle from said container.

12. A method in accordance with claim 11 which also includes the steps of draining excess sample from said container and resealing said container against undue environmental contamination 13. A method in accordance with claim 11 wherein said sample is a liquid to be tested for its bacteria content, said receptacle contains at least one bacteria culture medium and a bacteria culture count grid aligned therewith and which includes the steps of contacting said medium with said liquid sample, draining excess liquid sample from said medium and said container, and after closing said receptacle with said cover, incubating said medium, calculating the average number of bacteria cultures per grid block and comparing said number against a standard to thereby determine the quality of said liquid.

14. A method in accordance with claim 13 which includes the steps of subjecting the bacteria cultures formed in said medium to various drugs to determine the most effective manner of treating said liquid.

15. A method in accordance with claim 11 wherein said liquid is selected from the group consisting of water and milk.

16. A method of obtaining a sample of milk and identifying a particular bacteria therein which comprises
providing a rigid open receptacle having therein a culture medium selective to a particular bacteria suspected to be in said milk and a rigid cover therefor in a flexible container sealed against undue environmental contamination,
forming an orifice in a wall of said container for admitting a sample of milk into said rigid open receptacle,
passing a sample of milk through said orifice into said receptacle and into contact with said medium,
forming a drain orifice in said container and draining therethrough excess milk from said receptacle and said container,
covering said rigid open receptacle with said cover by manipulating said cover and receptacle from outside of said container and through said container walls, and
incubating said receptacle for a sufficient period of time to allow for the growth of said particular bacteria culture on said medium if said particular bacteria is present in said milk.

17. A method in accordance with claim 16 wherein the milk sample is taken directly from the udder of a cow and said medium in said receptacle is a medium capable of growing bacteria which causes mastitis in cows.

18. A method in accordance with claim 16 wherein said admittance orifice and said drainage orifice are provided with sealing means and which includes the steps of sealing said admittance orifice after passing said milk therethrough and sealing said draining orifice after draining excess milk therefrom.

19. A method in accordance with claim 18 wherein the sealing of said orifice forms substantially hermetic seals.

20. A method in accordance with claim 16 wherein covering said rigid receptacle with said cover substantially hermetically seals said rigid receptacle.

21. A method in accordance with claim 16 wherein said receptacle also includes a bacteria culture count grid aligned with said medium and which includes the step of counting the average number of bacteria cultures per grid block and comparing this number against an average.

22. A method in accordance with claim 16 which also includes the step of subjecting bacteria cultures found in said medium to various antibiotics to determine the most effective antibiotic for treatment.

* * * * *